(Model.)

D. UNTERMEYER.
Finger Ring.

No. 241,453.                    Patented May 10, 1881.

WITNESSES:
Chas. Niola
C. Sedgwick

INVENTOR:
D. Untermeyer
BY Munn & Co
ATTORNEYS.

UNITED STATES PATENT OFFICE.

DAVID UNTERMEYER, OF NEW YORK, N. Y.

FINGER-RING.

SPECIFICATION forming part of Letters Patent No. 241,453, dated May 10, 1881.

Application filed November 13, 1880. (Model.)

*To all whom it may concern:*

Be it known that I, DAVID UNTERMEYER, of the city, county, and State of New York, have invented a new and useful Improvement in Finger-Rings, of which the following is a specification.

Figure 1:
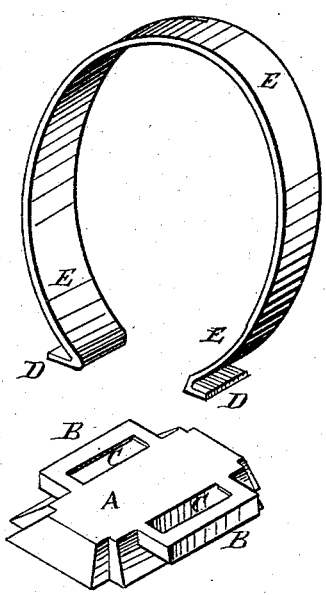
Figure 2:
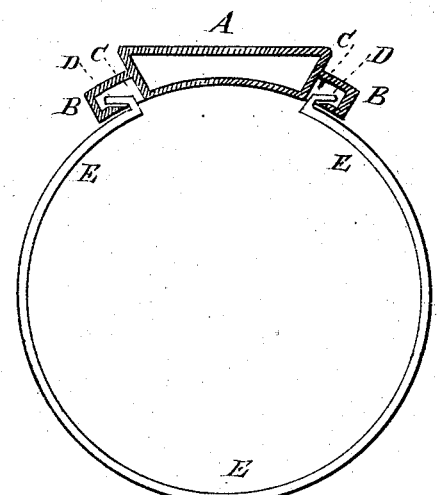

Figure 1 is a perspective view of the improvement, the parts being shown separated. Fig. 2 is an elevation, partly in section.

The object of this invention is to furnish finger-rings so constructed that the shanks can be detached from the heads and replaced with larger or smaller shanks.

The invention consists in constructing a finger-ring of a head having sockets upon its inner side, and a separate shank having hooks upon its ends to adapt the head and shank to be detachably connected, as will be hereinafter fully described.

Similar letters of reference indicate corresponding parts.

A represents the head of a ring, which may be made wholly of metal, or may have a stone set in it. The head A can be made of any desired shape or style and of any suitable material. In the under side of the head A, or in shoulders B formed upon the sides of the said head A, are formed sockets C, to receive hooks D formed upon the ends of the shank E. The shank E can be made of any desired shape, size, or style, and of any suitable material. The bases of the hooks D are made flat to fit against the flat inner sides of the sockets C, so that the shank E will not be liable to become detached from the head A while the ring is being worn. The arms of the hooks D are made straight and incline outward from the body of the shank E, as shown in Figs. 1 and 2. By pressing one end of the shank E inward its hook D will be withdrawn from its socket C, and the other hook D will then pass out of its socket. The shank E is attached to the head A by inserting one of the hooks D in one of the sockets C and then pressing the other end of the said shank inward until the end of its hook D enters the opening of the other socket C, so that the elasticity of the shank E can force the said hook into the said socket and hold it there.

With this construction, when a customer has selected a head that suits him, if the shank should be too large or too small for his finger, the said shank can be detached and replaced by a smaller or a larger shank, as required.

With this construction, should a customer desire a shank of a different style from the one attached to the head, the said shank can be detached and replaced by a shank of the required style.

If desired, the sockets C can be formed in the ends of the shank E and the hooks D can be formed upon the head A.

Having thus fully described my invention, I claim as new and desire to secure by Letters Patent—

1. A finger-ring constructed substantially as herein shown and described, consisting of the head A, having sockets C, and the separate shank E, having hooks D, as set forth.

2. In a finger-ring, the separate shank E, constructed with hooks D upon its ends, substantially as herein shown and described, to adapt it to be applied detachably to a head, A, having sockets C, as set forth.

DAVID UNTERMEYER.

Witnesses:
JAMES T. GRAHAM,
C. SEDGWICK.